United States Patent [19]
Abney

[11] Patent Number: 6,162,312
[45] Date of Patent: Dec. 19, 2000

[54] METHOD OF MAKING A RESIN IMPREGNATED COMPOSITE WOOD PRODUCT FROM WASTE, SCRAP, AND USED WOOD

[76] Inventor: Dennis R. Abney, 1533 Hickory Valley Rd., Sparta, Tenn. 38583

[21] Appl. No.: 09/232,921

[22] Filed: Jan. 19, 1999

[51] Int. Cl.[7] .............................. B27D 1/00; B27D 1/04; B27D 1/10
[52] U.S. Cl. ..................... 156/154; 156/256; 156/264; 156/265; 156/299; 156/307.3; 144/346
[58] Field of Search .......................... 428/106; 156/154, 156/94, 256, 250, 264, 265, 299, 300, 297, 307.3, 307.1, 307.7; 144/346

[56] References Cited

U.S. PATENT DOCUMENTS

| | | |
|---|---|---|
| 1,465,383 | 8/1923 | Walsh et al. . |
| 3,790,401 | 2/1974 | Maine ....................................... 427/297 |
| 4,012,548 | 3/1977 | Roberti .................................... 428/106 |
| 4,255,477 | 3/1981 | Holman . |
| 4,565,597 | 1/1986 | Schulte ................................ 156/264 X |
| 4,968,549 | 11/1990 | Smimizu et al. . |
| 5,346,574 | 9/1994 | Tamura et al. ........................... 156/257 |
| 5,525,394 | 6/1996 | Clarke et al. . |

FOREIGN PATENT DOCUMENTS

2212761  8/1989  United Kingdom .

Primary Examiner—Jeff H. Aftergut
Attorney, Agent, or Firm—Dykema Gossett PLLC

[57] ABSTRACT

The resin impregnated composite wood product comprises a plurality of wood layers, with each layer having relatively thin strips of wood. The strips in each layer are arranged at an angle to the strips of wood in adjacent layers. The strips of wood of such layers are saturated with resin throughout their length, width and thickness to fill the pores and when cured to provide a strong, tough, durable, long lasting product which is economical to manufacture.

8 Claims, 6 Drawing Sheets

METHOD OF MAKING A RESIN IMPREGNATED COMPOSITE WOOD PRODUCT FROM WASTE, SCRAP, AND USED WOOD

BACKGROUND OF THE INVENTION

1. Field of the Invention

This invention relates to resin impregnated composite wood products and to the method of making same utilizing most sources of wood such as logs, tops of logs remaining after a logging operation on land being cleared, scrap wood from saw mills, wood from buildings being destroyed and other wood sources where the wood usually ends up rotting on the land or in land fills. Environmental concerns and good business practices require the use of procedures and methods to eliminate the waste, to conserve natural wood resources and to promote the general welfare of this country in order to maintain a competitive position in wood products throughout the world.

2. Description of the Prior Art

Various attempts have been made to utilize laminated wood structures with varying degrees of success. U.S. Pat. No. 1,465,383 of Frank J. Walsh entitled "Composite Lumber" utilizes strips of soft wood of approximately one-fourth inch thick, cut to length and width. The strips are arranged in layers, with the strips of one layer arranged at a ninety degree angle to the strips in the adjacent layers. Cement is employed for the purpose of securing the layers together and is not used to saturate or soak into the entire mass of the wood for the purpose of filling the pores thereof with cement as in the present invention. Walsh permanently deforms the cells of the wood with pressure so as to bring the fibers themselves into permanent frictional contact and engagement with each other rather than to fill the cells with cement.

U.S. Pat. No. 4,255,477 of John A. Homan, entitled "Artificial Board of Lumber," teaches that an artificial lumber board having superior strength can be made by providing a plurality of boat-shaped wood strips, each wood strip being elongated defining first and second ends with tapered tip portions formed adjacent each said first and second ends reduced in thickness relative to a medial portion of the wood strip. An adhesive coating is carried by each wood strip and the wood strips are compressed in the artificial board aligned generally longitudinally extending in the board. The tapered tip portions terminate at a substantial point enabling the compressed wood strips to join and fit one another generally at a point contact reducing the presence of void spaces in the artificial board.

U.S. Pat. No. 4,968,549 of Shin Smimizu, et al entitled "Laminated Material Made of Annual Legnocellulosic Stalks" discloses and claims a laminated board made from legnocellulosic stalk, with the board having a plurality of sheets which are stacked and bonded with a resin adhesive.

U.S. Pat. No. 5,525,394 of John T. Clarke, et al entitled "Oriented Strand Board-Fiberboard Composite Structure and Method of Making the Same" discloses an oriented strand board-fiberboard composite structure having multiple wood layers.

Such laminated materials are used for various building materials, such as heat insulating materials, building material for fixture, sound absorbing materials, and furniture materials or structural building materials. Building materials other than plywood and veneer include wood based materials such as particle board and fiberboard.

Particle board is made by combining wood chips and a synthetic resin adhesive mixture with heat and pressure. Fiberboard is made by compressing wood and other vegetable fibers. Particle board and fiberboard do not suffer from aeolotropy in practical use and lack the shortcomings of natural materials, such as knots, rot, dimensional distortion, and warping. Furthermore, one can select the desired specific gravity, thickness, and size of these boards according to use.

The main material of the above-mentioned wood based materials is natural wood, the supply is limited and may not be sufficient to meet demand in the future. Thus, there is a fear that wood based materials will become expensive unless substitute composite wood products are found utilizing scrap wood and which can serve as a substitute for natural wood based materials.

SUMMARY OF THE INVENTION

The prevent invention relates to utilizing logs, tops of logs left after logging, scrap wood from saw mills, wood from buildings which are torn down, and from other wood sources. The method employed utilizes a power-driven blade or shaver in order to form relatively thin strips of wood which can be utilized in the manufacture of the novel wood products.

A power-driven double-edged blade is utilized to form the relatively thin strips, each strip having a thickness from one thirty-second inch to three-sixteenth inch, a length, as an example, from twelve inches to ninety-six inches, and a width, as an example, from two inches to twelve inches. Prior to use the thin wood strips are dried and are graded.

The invention further contemplates a method of making a resin impregnated composite wood product which comprises the steps of taking thin strips of wood which have been graded, having a length in the range of twelve inches or more, a width in the range of two inches or more and a thickness in the range of one thirty-second inch to three-sixteenth inch and arranging the strips of wood on a support in end to end relationship and in side by side relationship to form a first layer of generally rectangular configuration.

The method includes the step of applying a sufficient amount of resin to the top surface of the first layer throughout its length and width which seeps through the first layer causing it to swell. The resin is absorbed through the pores or interstices of the wood strips thereby causing the layer to bulge outwardly and to increase in size or volume.

The method further includes the step of the forming a second layer of wood strips on the top surface of the first layer, with the wood strips of the second layer arranged at an angle to the strips of the first layer. Thereafter, a sufficient amount of resin is applied to the top surface of the second layer which seeps through the second layer causing it to swell and to bulge outwardly.

The method further includes the step of building additional layers, as an example, anywhere from three to thirteen additional layers, with wood strips in each additional layer arranged at an angle to the wood strips in the proceeding layer and with each additional layer having resin placed on the top surface thereof to saturate same throughout its length and width causing it to swell and to bulge outwardly.

After the requisite thickness has been exceeded, the body comprising the resin saturated wood layers is placed in an press where it is subjected to pressure to thereby reduce the thickness of the layers to the required thickness while the resin is being cured. It is further contemplated that heat may be applied to the multiple-layered resin saturated wood body while in the press in order to assist in curing same. One or any number of resin saturated wood bodies, each with multiple layers, may be placed in the press at the same time where the bodies are cured simultaneously.

Once the resin-cured wood layer bodies are removed from the press, the method includes the step of the trimming of the edges to remove irregularities from the peripheral surfaces and the additional step of finishing one or both of the outer surfaces of the resin-cured layers.

It is a feature of the present invention to provide a method of making a resin impregnated composite wood product comprising the step of arranging the relatively thin strips of wood in one layer at an angle with respect to the relatively thin strips of wood in the adjacent layer or layers, said angle being in the range of 20° to 90°.

Another feature of the present invention is to comprise a method of making a resin impregnated composite wood product comprising the steps of utilizing a brush or an airbrush for applying the resin to the several layers in order to saturate same.

Still another feature of the present invention is to provide a method of making a resin impregnated composite wood product comprising the step of utilizing a drum sander to finish one or both of the outer surfaces of the wood layers.

A further feature of the present invention is directed to a method of making a resin impregnated composite wood product comprising the step of utilizing thin strips of wood having a thickness in the range of one thirty-second inch to three-sixteenth inch.

A still further feature of the present invention is to provide a method of making a resin impregnated composite wood product utilizing thin strips of wood, with each strip having a length in the range of twelve inches to ninety-six inches, a width in the range of two inches to twelve inches, and a thickness in the range of one thirty-second inch to three-sixteenth inch.

Another feature of the present invention is to provide a method of making a resin impregnated composite wood product comprising the step of using a power-driven blade to shave the relatively thin strips of wood from logs, tops of logs, used lumber and other sources of scrap wood.

Another feature of the present invention is to provide a resin impregnated composite wood product comprising a plurality of layers, with each layer having relatively thin strips of wood, with the strips in each layer arranged at an angle to the strips of wood in adjacent layers, the strips of wood of such layers being saturated with resin throughout its length, width and thickness to result in a unified body when cured, with the grain of adjacent layers crossing each other.

Still another feature of the present invention is to provide a resin impregnated composite wood product with the angle of the wood strips being in the range of 20° to 90°.

A further feature of the present invention is to provide a resin impregnated composite wood product having anywhere from three to thirteen layers.

A still further feature of the present invention is to provide a resin impregnated composite wood product having a body with dimensions of approximately ninety-six inches or more in length, approximately forty-eight inches in width and a thickness of approximately three-sixteenth inch or more.

The final feature of the invention is to provide a resin impregnated composite wood product which is strong, tough, durable, long lasting and is economical to manufacture.

DESCRIPTION OF THE PREFERRED EMBODIMENT

Figures 1, 2:
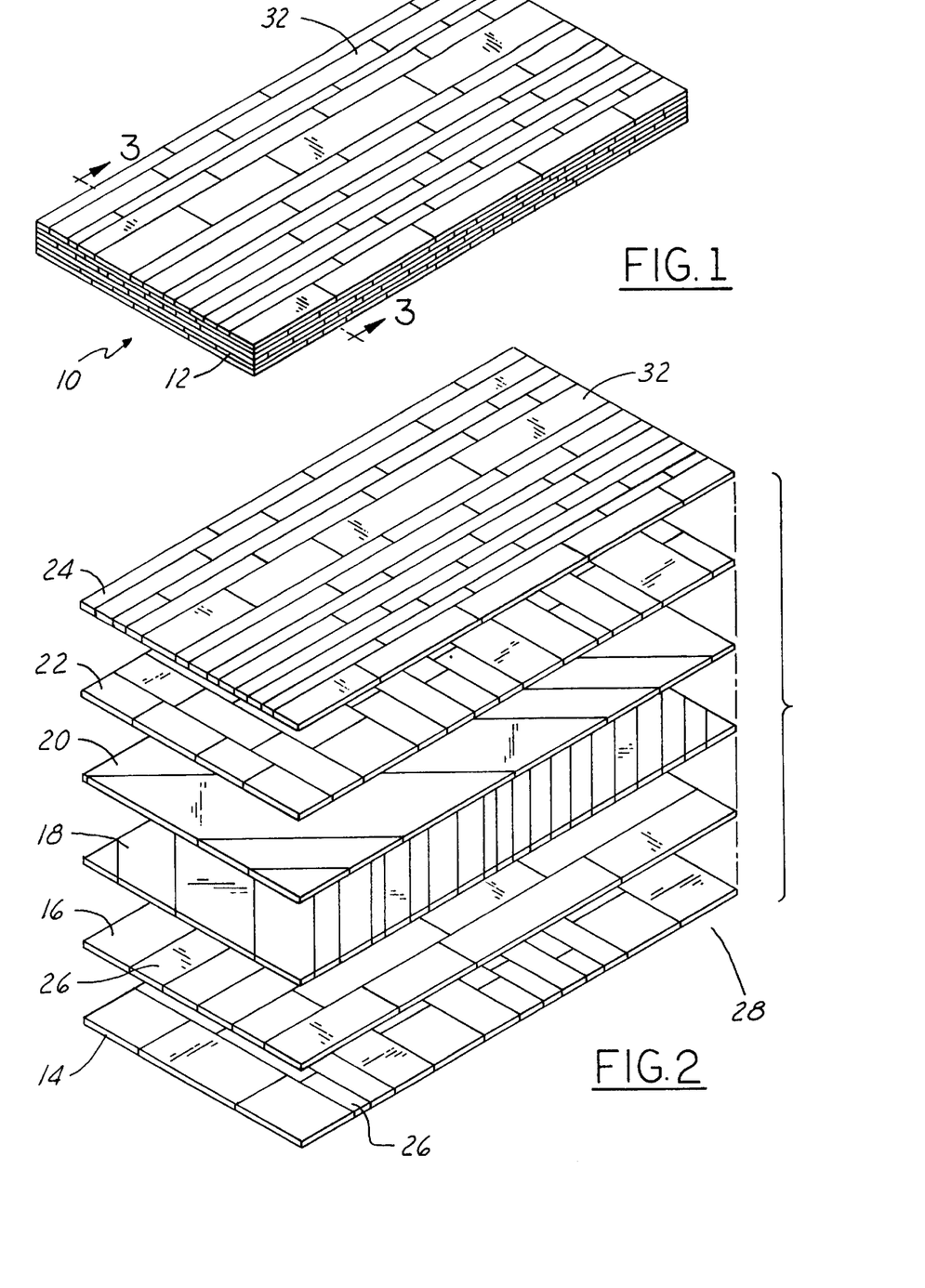
FIG. 1 is a perspective view of a resin impregnated composite wood product.
FIG. 2 is an exploded view of the resin impregnated composite wood product illustrating the layers spaced apart and with the relatively thin wood strips in each layer arranged at an angle to the adjacent layer or layers.

Referring now to the drawings and specifically to FIGS. 1 and 2, there is illustrated a resin impregnated composite wood product 10 having a body 12 with multiple layers 14, 16, 18, 20, 22, and 24. Each layer consists of relatively thin wood strips 26, each strip 26 having a thickness from 1/32" to 3/16", a length from 12" to 96" and a width from 2" to 12".

Figure 8:
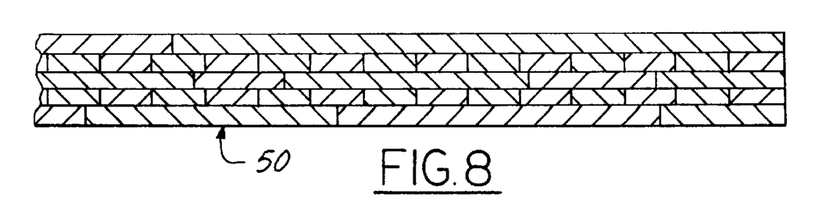
FIG. 8 is a fragmentary elevational view, in section showing a five-layered body impregnated with resin throughout after the body has been removed from the press.
Figure 9:
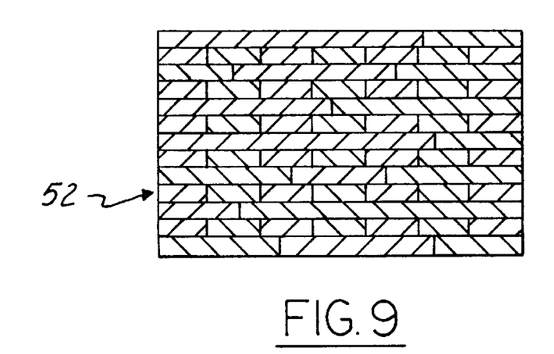
FIG. 9 is an elevational view, in section illustrating a resin impregnated wood product comprising thirteen layers.

It will be appreciated that any number of layers may be utilized to form a resin impregnated composite wood product 10. FIG. 1 illustrated a six layered body; FIG. 8 illustrates a five layered body and FIG. 9 illustrates a thirteen layered body.

In each instance, the relatively thin strips 26 of wood in each layer is arranged at an angle with respect to the relatively thin strips 26 of wood in adjacent layers, the angular relationship being in the range of 20° to 90°. It will be observed from reviewing FIG. 2 that the relatively thin strips 26 of wood in layer 16 are arranged at an angle of 90° with respect to the relatively thin strips 26 of wood in layer 14. The strips of wood 26 in layer 18 are arranged at an angle of approximately 45° with respect to the strips of wood 26 in layer 16, etc.

Referring once again to FIGS. 1–3 inclusive, the resin impregnated composite wood product 10 represents a basic panel with dimensions of 48" in width, 96" in length and a thickness of 3/16" more or less. In manufacturing a panel of the size just described, relatively thin strips of wood 26 are placed on a support 28 to form the first layer with dimensions of 48" more or less, 96" in length more or less and a thickness from 1/32" to 3/16" more or less. Thereafter, a brush or an airbrush is utilized to apply the resin to layer 14. It has been found that a phenol formaldehyde resin supplied by Georgia Pacific or by Borden Chemical may be used. The resin seeps through the pores or interstices of the wood strips thereby causing the wood strips of the layer to bulge outwardly and to increase in size or volume. The resin is applied throughout the entire length and width of the layer 14.

Once the resin has impregnated layer 14 throughout its length, width and depth, the strips 26 of layer 16 are arranged on the top surface of layer 14 at an angle such as 90° as illustrated in FIG. 2. Layer 16 has approximately the same dimension as layer 14 which is 96" in length, 48" in width and a depth from 1/32" to 3/16", more or less. As with layer 14, resin is again applied by brush or an airbrush to the top surface of layer 16 throughout its length and width. As with layer 14, the resin is absorbed through the pores or interstices of the wood strips 26 thereby causing the layer 16 to bulge outwardly thereby increasing the size or volume of same.

The steps just described of laying the wood strips 26 at an angle to the strips of the preceding layer and thereafter soaking or saturating the strips 26 whereby the resin is absorbed through the pores or interstices is repeated with each subsequent layer 18, 20, 22 and 24.

While a phenol formaldehyde resin may be utilized, other resins or resin adhesives may be used such as those selected from the group consisting of isocyanate adhesives, thermosetting adhesives, cold-setting adhesive and water emulsion adhesives. The isocyanate adhesives include polyisocyanate resins and self-emulsifying polyisocyanate resins. The thermosetting adhesives include phenolic resins, melamine resins, urea resins, and epoxy resins. The cold-setting adhesives include epoxy resins, polyurethane resins, water vinylurethane resins, phenolic-vinyl acetate copolymer emulsions and other condensation resins.

Figure 3:
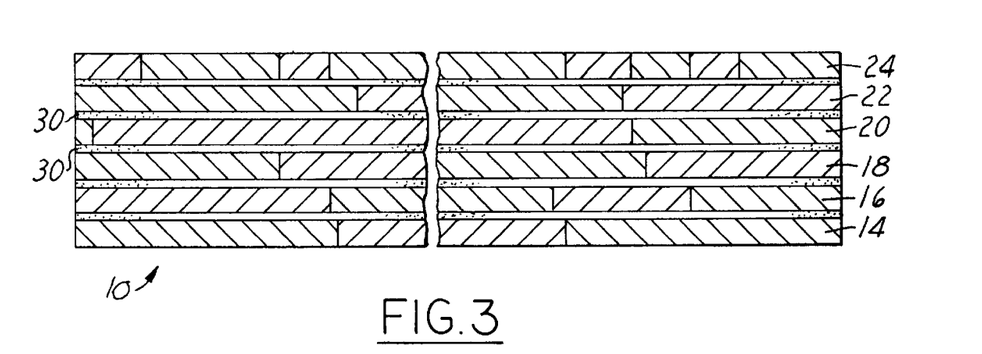
FIG. 3 is an elevational view of the resin impregnated composite wood product taken on the line 3—3 of FIG. 1, with parts broken away.
Figure 4:
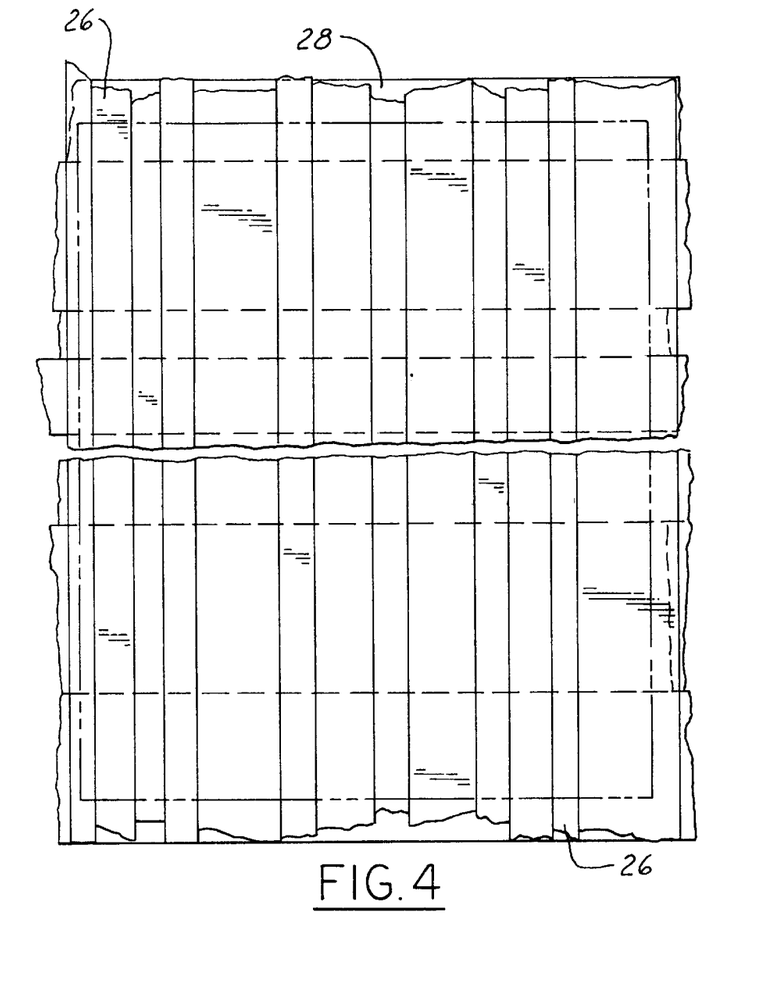
FIG. 4 is a top view of a resin impregnated composite wood product on a support prior to insertion into a press.

The resin impregnated composite wood product 10 illustrated in FIG. 3 illustrates the layers 14, 16, 18, 20, 22, and 24 separated by relatively thin layers of resin 30. However, it should be appreciated that the resin also penetrates the entire length, width and thickness of each layer.

Figure 5:
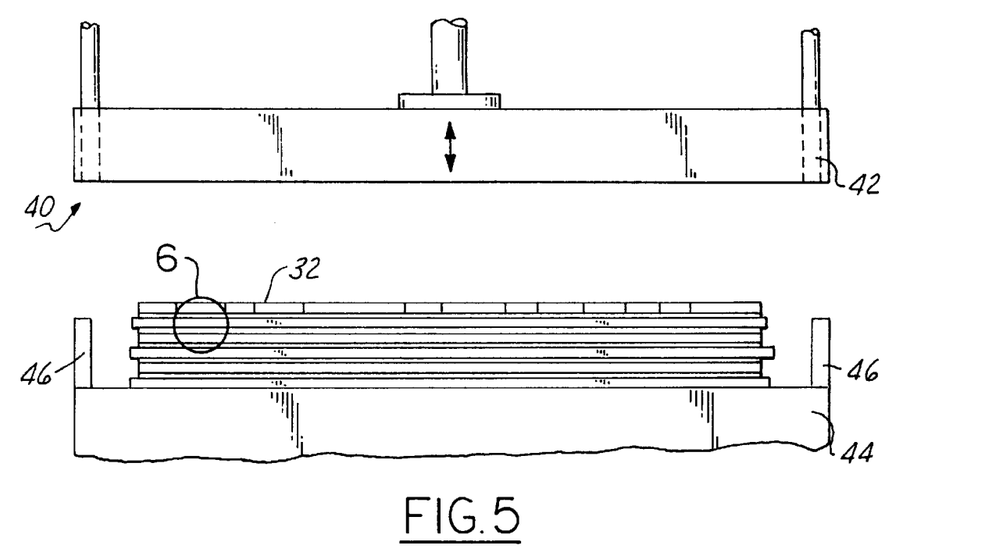
FIG. 5 is an elevational view of a press in an open position showing the resin impregnated multiple layered body in the press prior to applying pressure thereto.

The multi-layered resin impregnated body 12, after it is formed, is moved to a press 40. The press 40 may be a cold press where one or any number of multi-layered bodies 12 are stacked and subjected to pressure. As an alternative, the press 40 may be a hot press where the multi-layered bodies 12 are stacked and then bonded with heat and pressure.

Figure 7:
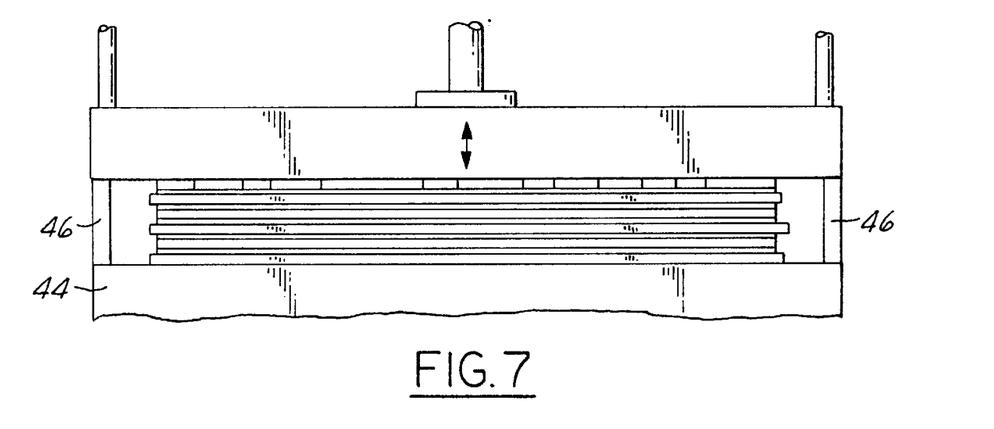
FIG. 7 is an elevational view of the press showing the movable platen applying pressure to the resin impregnated and swollen multiple layered body.

The press 40 has an upper movable platen 42 and a fixed platen 44. Spacers 46 are provided on the fix platen 44. If press 40 is a cold press, then the platen 42 is lowered engaging the top surface 32 of the body 12 so as to subject the body 12 to pressure thereby reducing the thickness of the body 12 as determined by the press stops 46. The pressure applied by the press 40 reduces the thickness of the body 12 and thereafter the resin is permitted to set or cure so as to form the resin impregnated multi-layered wood product 10. Any excess resin squeezed from the multi-layered body 12 is collected and thereafter removed from the press. The multi-layered bodies 12 may remain in the press from twenty-four hours to forty-eight hours depending on the thickness of each body 12.

If a hot press is utilized, the temperature and pressure conditions of the bond process may be selected from the range of room temperature of 80° F. to, as an example, 300° F. and from the pressure range of from 175 pounds p.s.i. to 100 tons p.s.i, respectively depending on the adhesive or resin used, the number of stacked bodies 12 and the desired specific gravity of the resulting product.

It will be appreciated that any number of bodies 12 may be placed in a press, with each of the bodies separated by metal plates in order to uniformly bond the multi-layered bodies 12. When heat is used to assist in the curing of the resin, the press time required for completing the cure is substantially reduced to six to ten hours depending on the resin used.

Figure 6:
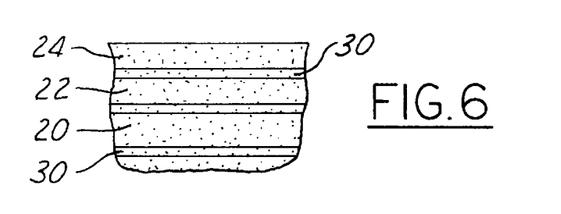
FIG. 6 is a fragmentary view of part of the multiple layered body taken on the line 6 of FIG. 5 and illustrating the penetration of the resin throughout.

FIG. 6 illustrates an exploded view of the body 12 showing the resin 30 impregnated throughout the entire body. The resin provides extra strength to the product.

FIG. 8 illustrates a multi-layered product 50 having five layers. The resin impregnated multi-layered composite wood product 52 of FIG. 9 has thirteen layers. It will be appreciated that the product may have any number of layers depending on its intended use. It was earlier explained that a basic panel having dimensions of approximately 48" in width, 96" in height and 3/16" in thickness, more or less, may be produced and utilized like plywood panels of the same dimension. In addition, the method disclosed may be used to make plank panels having a width of 48", a length of 96" and a thickness of 1", more or less. Once the plank panel has been produced, it can be cut in order to make planks used for roofs, floors or decks. In addition, block panels may be formed of a size, as an example, 48" in length, 96" in height and 2" thick, more or less. Such block panel would be cut to form framing material. The panels just described can be used where plywood, fiberboard and finished paneling are now used. The plank panels may be cut into desired widths in order to form planks. The block panels may be cut into desired width in order to form framing material such as 2×4's, 2×6's, 2×8's and 2×10's.

Figure 12:
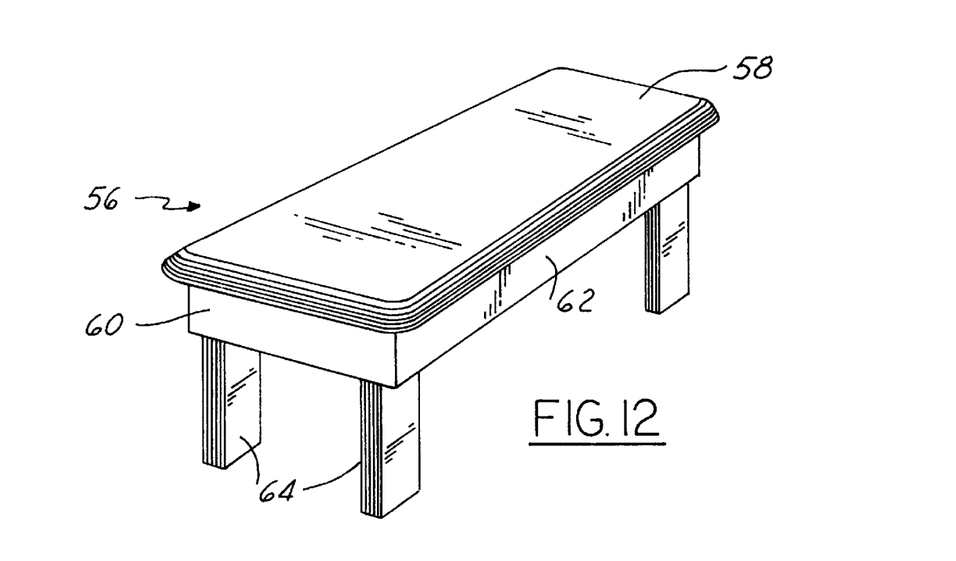
FIG. 12 is a perspective view of a bench or table utilizing resin impregnated wood products for the horizontal support, framing and the legs.

The resin impregnated composite wood products just described may thereafter be used to form furniture, as an example, the bench or table 56 illustrates in FIG. 12. Table 56 may be constructed from plank and block panels to form the support 58, the framing members 60, 62 and the legs 64. Such table 56 will permit a person to observe that the grain of the wood in one layer is at angle to the grains of adjacent layers. The resin which has soaked through the laminated wood layers when cured brings out the grain and assists in increasing the attractiveness and beauty of a wood product such as the table 56.

Figure 10:
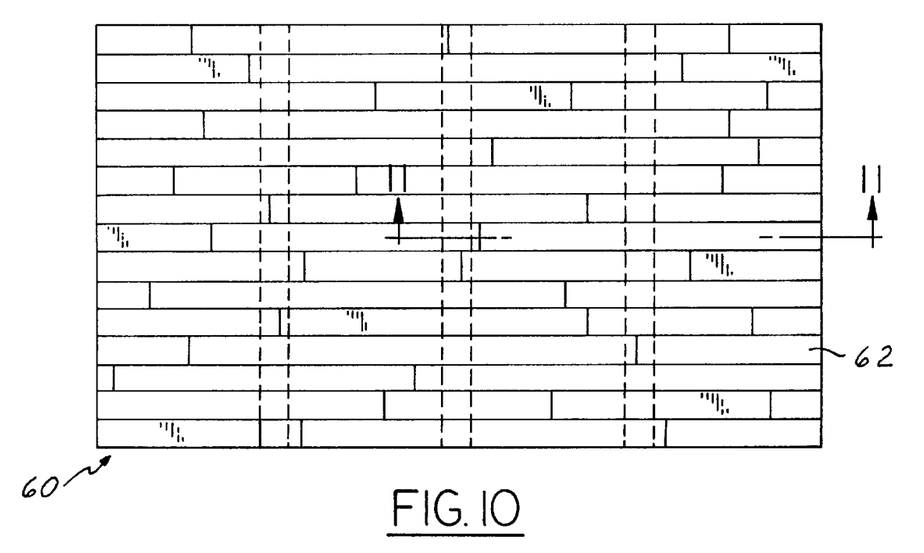
FIG. 10 is an elevational view of a wall utilizing a pair of multi-layered panels formed according to the present invention, with the panels being spaced apart by a plurality of ribs to provide dead air spaces in the wall.
Figure 11:
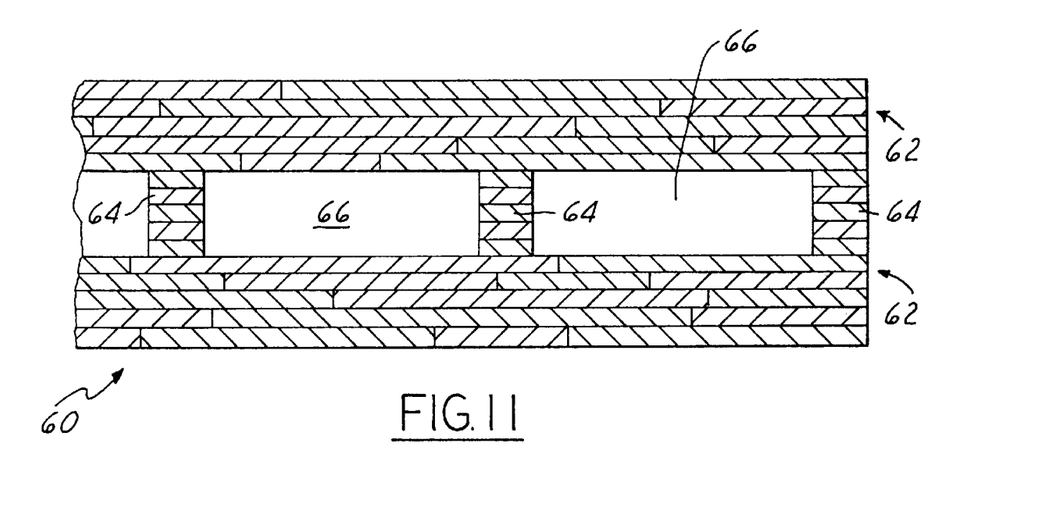
FIG. 11 is a fragmentary sectional view taken on the line 11—11 of FIG. 10.

It is also contemplated that the present invention may be used to manufacture a multi-layered solid wall 60 as illustrated in FIGS. 10 and 11. The wall 60 is manufactured by increasing the size of a block panel 62 which would have a length of 16', a height of 8' and a thickness of 2". The wall 60 includes a pair of block panels 62, each of the size mentioned. The block panels 62 are spaced apart by means of ribs 64 cut from resin impregnated composite wood planks described previously. The ribs 64 are 1" thick by 2" in width and are adhesively secured to the block panel 62. The ribs 64 are spaced apart to provide within the wall 60 air spaces 66. Such wall 60 eliminates the requirement for installation, drywall and most all framing and results in a self contained solid wall which is 16' in length, 8' in height and a thickness of 5", more or less.

As mentioned previously, the thin wood strips 26 are shaved or cut from many sources such as logs, tops of logs left after logging, and scrap wood provided on land being cleared. The applicant also intends to use scraps of wood from buildings being destroyed or torn down and from any available wood sources in order to utilize waste wood in an efficient manner thereby contributing to the environment and helping to preserve natural wood resources. Wood of different hardnesses may be used in the same body.

Figures 13, 14:
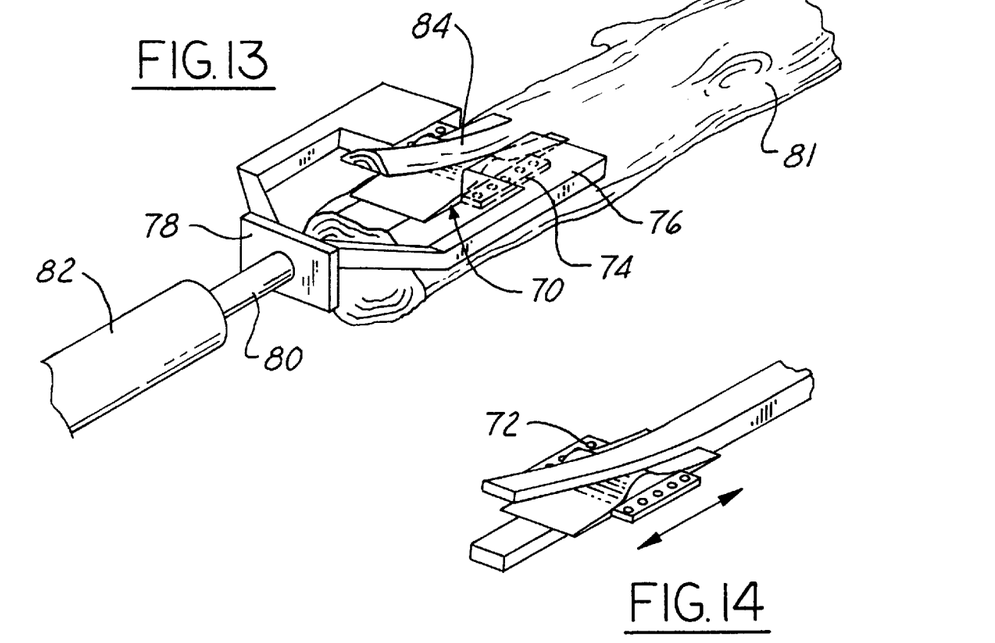
FIG. 13 is a perspective view illustrating a power driven tool or shaver having a double edge blade and cutting a relatively thin strip of wood from a wooden log.
FIG. 14 is a perspective view of the double edge blade or tool utilized to cut a relatively thin strip from wood stock.

FIG. 13 illustrates a tool 70 having a double edge blade 72, a holder 74 mounted in a frame or support 76. The frame 76 has a front plate 78 through which the rod 80 of a hydraulic power cylinder 82 extends. The rod 80 is attached to the double edged blade 72 so as to stroke the tool in one direction to shave and remove the strip 84. After the blade 72 has moved in one direction, it may also be pulled in the opposite direction by cylinder 82 using the other edge of the blade 72 to shave or cut a relatively thin strip of material from the wooden log 81. The strips may be cut in various lengths anywhere from 12" to 96" with widths from 2" to 12" and a thickness from $\frac{1}{32}$" to $\frac{3}{16}$". While FIG. 13 illustrates the shaving of a strips from a log, FIG. 14 illustrates the shaving of a strip from other wood stock. Prior to use the strips are dried to rename the moisture. The strips may also be graded as to length, width and thickness.

Figure 15:
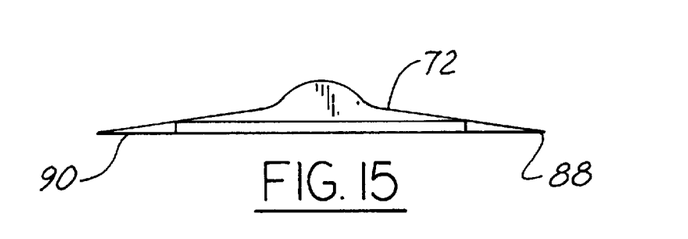
FIG. 15 is a side elevational view of the tool illustrating a cutting blade at each end of the tool.
Figure 16:
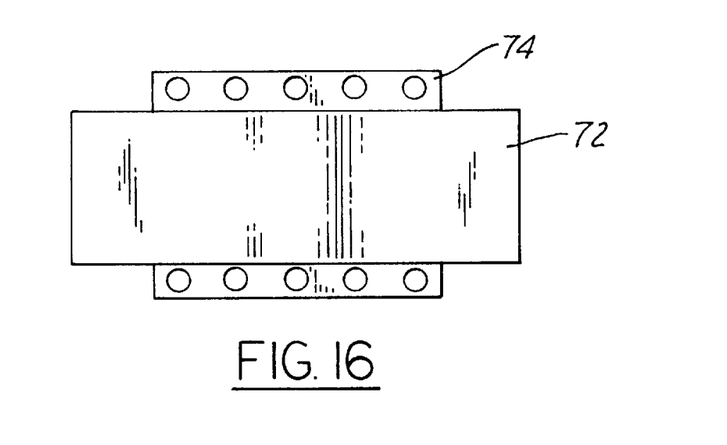
FIG. 16 is a top elevational view of the double edge blade and tool and the support therefore.

FIG. 15 illustrates the blade 72 having a forward cutting edge 88 and rearward cutting edge 90. The blade 72 as mentioned previously is guided in the frame 74 which is appropriately affixed to the frame 76.

The cylinder 82 may have a stroke of ninety-six inches to shave or cut strips having the same length.

Thus, it can be seen that a highly advantageous wood product can be made which compares favorably to the qualities of structural lumber and similar products now on the market. The resulting resin impregnated composite wood product is hard, durable and attractive due to the resin utilized in making the product.

While a preferred embodiment of the invention has been described using specific terms, such description is for illustrative purposes only and it is to be understood that changes and variations may be made without departing from the spirit or scope of the following claims.

What I claim is:

1. The method of making a resin impregnated composite wood product from waste, scrap and used wood comprising the steps of:
   (a). using a power driven double edge blade to shave relatively thin strips of wood from logs, tops of logs, used lumber and other sources of scrap wood, with the strips of wood formed being of different lengths, widths and thicknesses;
   (b). grading the strips of wood as to length, width and thickness, with each strip having a length of twelve inches to ninety-six inches, a width of two inches to twelve inches and a thickness in the range of one-thirty second inch to three-sixteenth inch;
   (c). arranging on a support in rows strips of wood of different lengths, with the wood strips in each row being arranged end-to-end, while the wood strips in adjacent rows being side-by-side and different lengths to form a first layer of generally rectangular configuration;
   (d). applying a sufficient amount of a resin to the top surface of said first layer throughout its length and width which seeps through said first layer causing it to swell;
   (e). repeating step (c) to form a second layer of wood strips on the top surface of said first layer, with the wood strips of said second layer arranged at an angle to the wood strips of said first layer;
   (f). repeating step (d) by applying a sufficient amount of a resin to the top surface of said second layer which seeps through said second layer causing it to swell;
   (g). repeating steps (c) and (d), with the wood strips in each additional layer arranged at an angle to the wood strips in the preceding layer;
   (h). placing the resin impregnated wood layers in a press and subjecting the layers to pressure to thereby reduce the thickness of the layers to the required thickness of the wood product while the resin is being cured;
   (i). removing the resin cured wood layers from the press;
   (j). trimming the edges of the resin cured layers to remove irregularities from the peripheral surfaces; and
   (k). finishing one of the outer surfaces of the resin impregnate composite wood product.

2. The method of making a resin impregnated composite wood product as defined in claim 1 comprising the steps of arranging each of the layers at an angle in the range of 20° to 90° with respect to the previous layer.

3. The method of making a resin impregnated composite wood product as defined in claim 1 comprising the step of drying the wood strips prior to use to remove the moisture therefrom.

4. The method of making a resin impregnated composite wood product as defined in claim 1 comprising the step of utilizing a brush for applying the resin to the several layers.

5. The method of making a resin impregnated composite wood product as defined in claim 1 comprising the step of utilizing an airbrush for applying the resin to the several layers.

6. The method of making a resin impregnated composite wood product as defined in claim 1 comprising the step of utilizing a drum sander to finish one or both of the outer surfaces of the wood layers.

7. The method of making a resin impregnated composite wood product as defined in claim 1 comprising after the wood layers are removed from the press, the step of cutting the layers in desired lengths and widths to form panels, planks or blocks.

8. The method of making a resin impregnated composite wood product as defined in claim 1 comprising the step of subjecting the layers to heat while in the press to assist in curing the resin as the pressure is applied.

* * * * *